United States Patent
Huschke et al.

(10) Patent No.: US 9,668,237 B2
(45) Date of Patent: May 30, 2017

(54) NOTIFICATION MECHANISM THAT ALLOWS A USER EQUIPMENT TO DISTINGUISH BETWEEN DIFFERENT MBSFN AREAS

(75) Inventors: Jörg Huschke, Aachen (DE); Mai-Anh Phan, Herzogenrath (DE); Ghyslain Pelletier, Laval (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1278 days.

(21) Appl. No.: 13/380,231

(22) PCT Filed: Jun. 8, 2010

(86) PCT No.: PCT/SE2010/050631
§ 371 (c)(1),
(2), (4) Date: Dec. 22, 2011

(87) PCT Pub. No.: WO2011/002390
PCT Pub. Date: Jan. 6, 2011

(65) Prior Publication Data
US 2012/0093060 A1    Apr. 19, 2012

Related U.S. Application Data

(60) Provisional application No. 61/221,366, filed on Jun. 29, 2009.

(51) Int. Cl.
*H04W 4/06* (2009.01)
*H04W 72/00* (2009.01)
*H04W 48/12* (2009.01)

(52) U.S. Cl.
CPC .......... *H04W 72/005* (2013.01); *H04W 48/12* (2013.01)

(58) Field of Classification Search
CPC .......................... H04W 72/005; H04W 48/12
(Continued)

(56) References Cited

U.S. PATENT DOCUMENTS

2008/0287129 A1* 11/2008 Somasundaram et al. ... 455/436
2009/0073909 A1    3/2009 Cai et al.
(Continued)

FOREIGN PATENT DOCUMENTS

CN        101420769 A     4/2009
WO    WO 2008/093997 A1   8/2008
(Continued)

OTHER PUBLICATIONS

"Notification mechanism for multiple MCCHs"; 3GPP Draft; R2-094507 (Notification mechanism for multiple MCCHs): Aug. 16, 2009, 3rd Generation Partnership Project (3GPP), Mobile Competence Centre, Ericsson: ST-Ericsson, Journal Article, tsg_ran\WG2_RL2\TSGR2_67\Docs , sections 2,3.
(Continued)

*Primary Examiner* — Parth Patel

(57) ABSTRACT

The embodiments of the present invention relate to a method and arrangement in a telecommunication system, in particular to methods and arrangements relating to overlapping MBSFN-areas. A notification mechanism is introduced that allows a user equipment to distinguish notifications for different MBSFN areas and different MBMS Control Channels. The user equipment then knows already upon reception of the notification whether it has to wake up and read a specific MBMS Control Channel. The embodiments of the present invention thus support multiple MBSFN areas per cell while still maintaining the benefits of reduced battery consumption in the UE due to said MBMS notification mechanism.

20 Claims, 3 Drawing Sheets

(58) Field of Classification Search
USPC .............. 370/312, 343; 455/436, 422.1
See application file for complete search history.

(56) References Cited

U.S. PATENT DOCUMENTS

| | | | |
|---|---|---|---|
| 2009/0245155 A1* | 10/2009 | Fukunaga et al. | 370/312 |
| 2010/0128646 A1* | 5/2010 | Gao | 370/312 |
| 2010/0128647 A1* | 5/2010 | Chun et al. | 370/312 |
| 2010/0157969 A1* | 6/2010 | Swamy et al. | 370/343 |
| 2010/0189026 A1* | 7/2010 | Lee et al. | 370/312 |
| 2010/0265867 A1* | 10/2010 | Becker et al. | 370/312 |
| 2010/0323684 A1* | 12/2010 | Cai et al. | 455/422.1 |

FOREIGN PATENT DOCUMENTS

| | | | |
|---|---|---|---|
| WO | WO 2008/114883 A1 | 9/2008 | |
| WO | WO 2009078152 A1 * | 6/2009 | H04H 20/71 |

OTHER PUBLICATIONS

Ericsson: "Overlapping MBSFN areas". 3GPP TSG-RAN WG2 #66. R2-093099. May 4-8, 2009. San Francisco, California.
CMCC, et al.: "Notification mechanism for eMBMS". 3GPP TSG-RAN WG2 Meeting #66bis. R2-093988. Jun. 29-Jul. 3, 2009. Los Angeles, California.

* cited by examiner

NOTIFICATION MECHANISM THAT ALLOWS A USER EQUIPMENT TO DISTINGUISH BETWEEN DIFFERENT MBSFN AREAS

This application is a 371 of PCT/SE2010/050631, filed Jun. 8, 2010, which claims the benefit of U.S. Provisional Application No. 61/221,366, filed Jun. 29, 2009, the disclosure of which is fully incorporated herein by reference.

FIELD OF THE INVENTION

The embodiments of the present invention relate to a method and arrangement in a telecommunication system, in particular to methods and arrangements relating to overlapping MBSFN-areas.

BACKGROUND

FIG. 1 provides a schematic illustration of a part of a cellular communication system 10, wherein each cell 14 comprises a network node 12, typically a radio base station, providing communication services to and from user equipments 11. One particular communication service offered in a communication system is Multimedia Broadcast Multicast Services (MBMS), which denote broadcast information services covering large geographic areas consisting of one or more cells. Since all these cells distribute the same services, the spectral efficiency of MBMS transmissions can be optimized by applying MBMS single frequency network (MBSFN) transmission. This means that identical data is transmitted on the same radio resources from more than one cell 14. The cells that offer the same set of MBMS services and the same scheduling of MBMS service sessions belong to on MBSFN area 13a,13b. The MBMS control channel (MCCH) is needed for the User Equipment (UE) to obtain service specific information necessary for MEMS service reception, e.g. physical multicast channel (PMCH) configuration such as modulation and coding scheme, MBMS subframe allocation etc.

In the current releases of the 3GPP-specifications for the Long term evolution (LTE) of UTRAN, only non-overlapping MBSFN areas are supported, i.e. one cell 14 can only belong to one MBSFN area. This implies as a consequence that only one MCCH is needed. However, future releases of LTE will also provide for overlapping MBSFN areas 13a, 13b, i.e. one cell 14 can belong to several MBSFN areas 13a,13b and there are several MCCHs per cell because there is one MCCH per MBSFN area 13a,13b.

In order to reduce battery consumption, MBMS notification mechanisms have been introduced, which inform about a change of content for a certain MBMS service. This implies that a UE does not have to periodically read the MCCH but only when a content change has occurred. These notification methods are based on paging mechanisms, i.e. the UE has to monitor the Physical Downlink Control Channel (PDCCH). There are mainly two options: According to one option, a new MBMS specific Radio Network Temporary Identifier (RNTI), the M-RNTI, is introduced to address UEs having subscribed to MBMS services. As soon as the UE finds the M-RNTI, it reads the MCCH. According to another option, the UE starts reading a received paging message when having received a paging RNTI, P-RNTI. The paging message may include notification information for MBMS. In that case, UE having subscribed to MEMS services start reading the MCCH.

SUMMARY

It has been observed to be a problem that the prior art solutions for MBMS notifications only support non-overlapping MBSFN areas. Consequently, a UE having subscribed to MBMS-services must read all MBMS control channels (MCCH) that are defined on the broadcast channel (BCCH) as soon as it has received a MBMS notification.

It is thus an object of the embodiments of the present invention to achieve an improved method and arrangement for notification of changes of the content of a MBMS service which is also applicable for overlapping MBSFN areas.

The solution according to the embodiments of the present invention is to introduce notification mechanisms that allows a UE to distinguish notifications for different MBSFN areas and, thus, for different MCCHs. The UE then knows already upon reception of the notification whether it has to wake up and read a specific MCCH.

It is an advantage of the embodiments of the present invention to support multiple MBSFN areas per cell while still maintaining the benefits of reduced battery consumption in the UE due to said MBMS notification mechanism.

Other objects, advantages and novel features of the invention will become apparent from the following detailed description of the invention when considered in conjunction with the accompanying drawings and claims.

DETAILED DESCRIPTION

There are several possibilities to signal to a UE which MCCH to read. The description below describes by means of examples embodiments that can be used to identify which MCCH a UE shall read on reception of a MBMS notification message. It is assumed for all embodiments that identifiers of at least some of the MBSFN areas, i.e. MBSFN area IDs, and their mapping to a respective MCCH are signaled on a broadcast channel, e.g. a BCCH.

Figure 1:
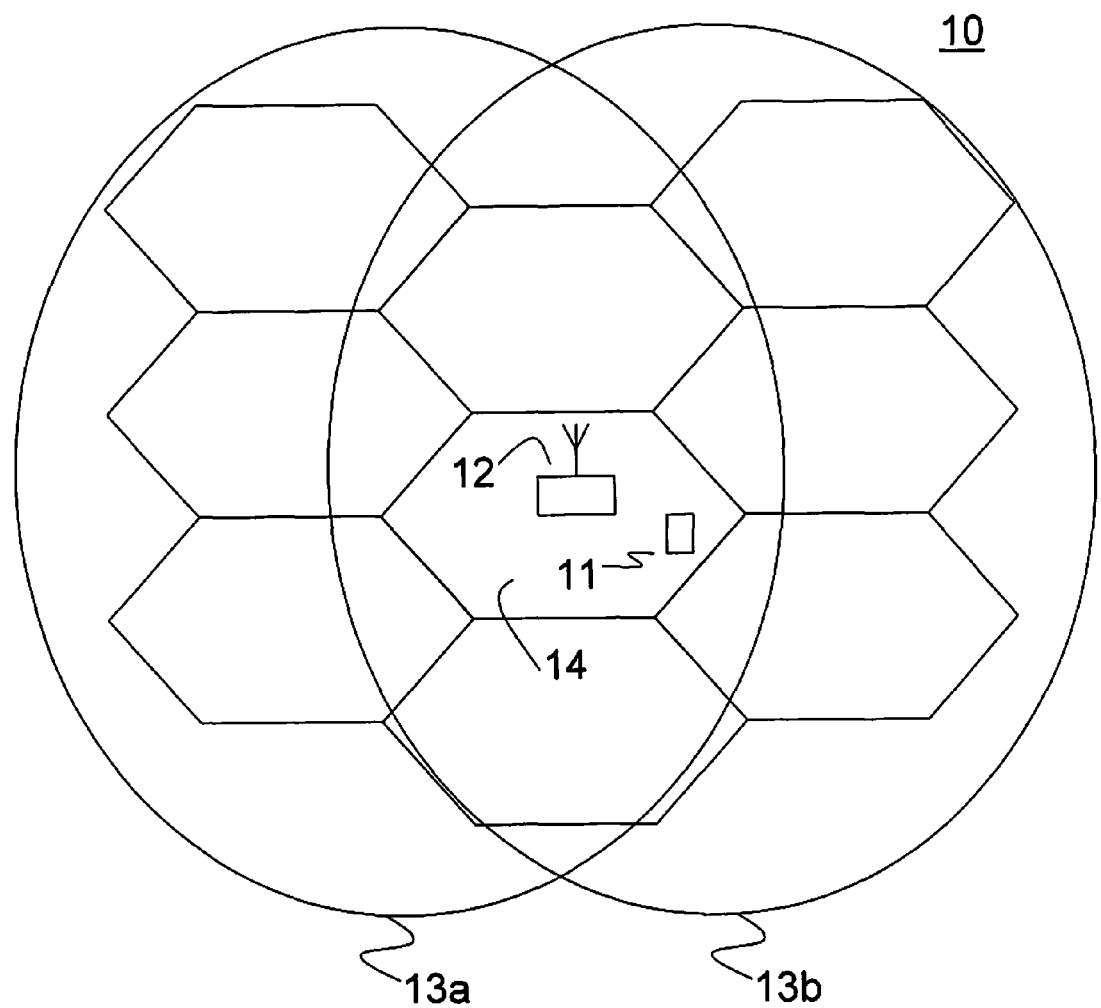
FIG. 1 illustrates a cellular communication system including by means of an example two MBFSN-areas.
Figure 2:
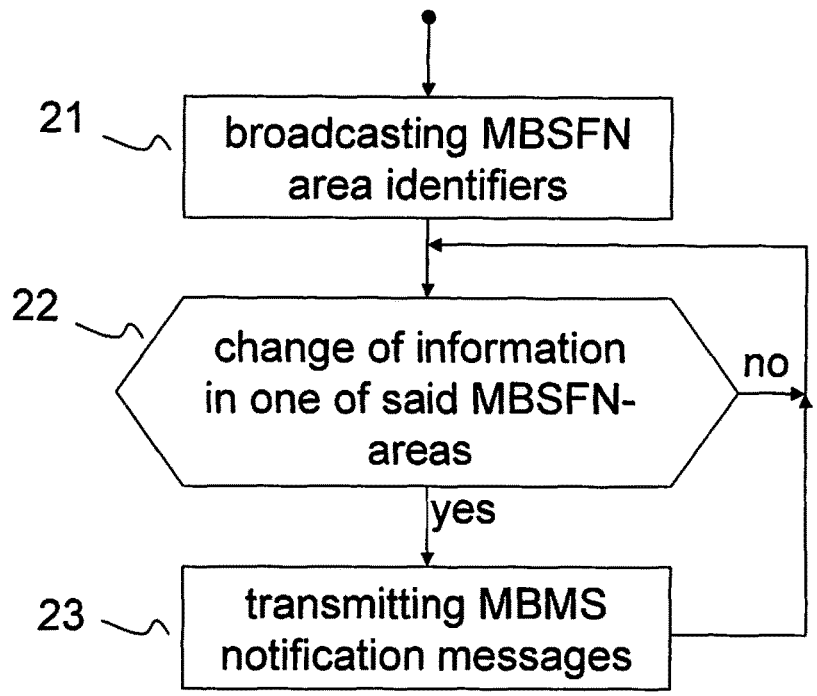
FIG. 2 illustrates an embodiment of the method according to the present invention performed in a network node.

A node 12 in a cellular communication system 10, intended to provide communication services to a plurality of user equipments 11 in a cell 14 of said cellular communication system and supporting broadcast information services in one or more MBSFN areas 13a,13b which include said cell 14, performs as shown in FIG. 2 the steps of broadcasting 21 information on identifiers of at least some of said MBSFN areas in order to identify the respective area-specific MBMS control channel and transmits 23 subsequently MBMS notification messages associated with one of said MBSFN areas based on said broadcasted information to the user equipments in said cell for notifying changes of the information 22yes in one of said MBSFN-areas.

Figure 3:
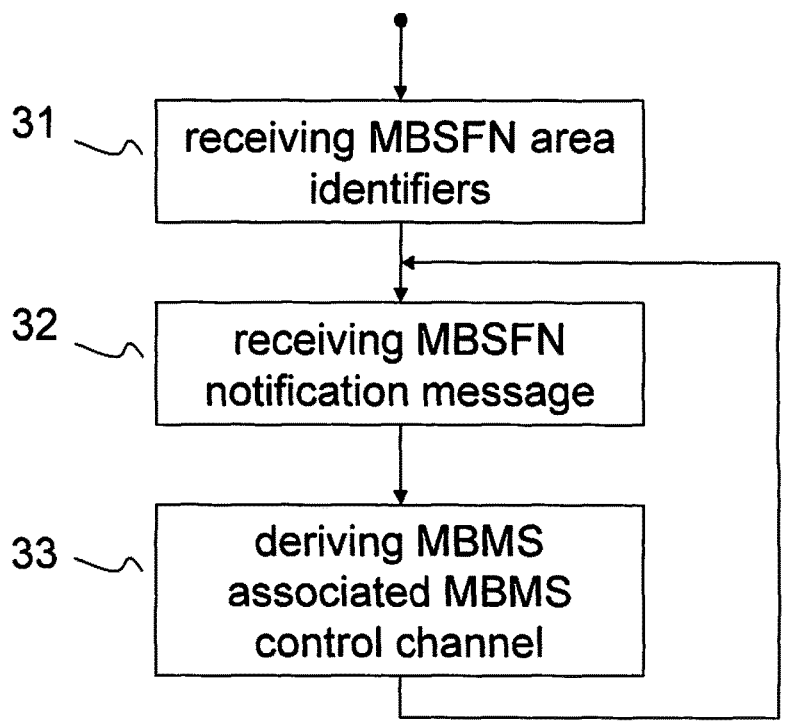
FIG. 3 illustrates an embodiment of the method according to the present invention performed in a user equipment.

Correspondingly, the user equipment 11 performs as shown in FIG. 3 the steps of receiving 31 on a broadcast channel such information on identifiers of at least some of said MBSFN areas and can thereafter on reception 32 of a MBMS notification message derive 33 from the identifiers of the one or more MBSFN areas included in the received MBMS notification message, the MBMS control channel that is associated with the intended MBSFN areas. Example embodiments of the present invention to make accessible information on identifiers of at least some of said MBSFN areas to user equipments are described below:

According to a first embodiment of the present invention, one unique M-RNTI is used per MBSFN area. These values can be, e.g., RNTI values that are currently reserved for future use or values that are used to identify a UE within the cell (e.g. cell RNTI, C-RNTI). The latter would reduce the number of RNTIs used for unicast. The mapping of the M-RNTIs identifying the MBSFN area to a MBSFN area specific MCCH is signaled on a broadcast channel, e.g. the BCCH. In this embodiment, the MBMS notification message of a content change in one of said MBSFN areas is associated with the unique identifier of said MBSFN area.

According to another embodiment of the present invention, one common M-RNTI is used for all MBSFN areas. In this embodiment the broadcasted MBMS notification message generally informs about a content change in one of the MBSFN areas whereas a UE can distinguish the MCCH of the MBSFN area for which said content change applies from information provided on a physical downlink channel (PDCCH) including information about the MBSFN area identifier.

According to yet another embodiment of the present invention, one common M-RNTI is used for all MBSFN areas. The broadcasted mapping information comprises radio frame offset information for each of the various MBSFN areas such that MBMS notification messages are sent on different subframes and thus allow distinguishing the MBSFN area where a content change occurred and identifying the MCCH that should be read by UEs subscribing to the service in said MBSFN area. In this embodiment the broadcasted MBMS notification message generally informs about a content change in one of the MBSFN areas whereas a UE can distinguish the MCCHs of the various MBSFN areas from broadcasted radio frame offset information. Upon reception of a MEMS notification message a UE only needs to "wake up" if the MCCH for a service that the UE subscribes to has been modified. The UE can directly read the relevant MCCH instead of receiving information on each MCCH.

Figure 4:
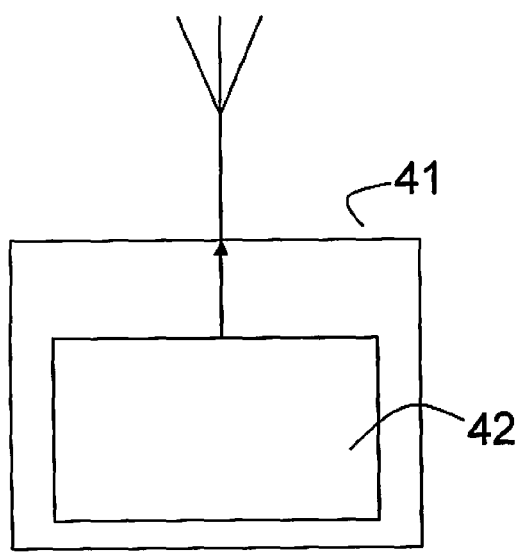
FIG. 4 illustrates an embodiment of an arrangement according to the present invention, in particular a network node.

In FIG. 4 there is illustrated a node 41, 12 of a cellular communication system 10 in accordance with an embodiment of the present invention. The node 41, 12 is configured for providing communication services to a plurality of user equipments 11 in a cell 14 of the cellular communication system 10. Furthermore, the node 41, 12 is configured for supporting broadcast information services in multiple MBSFN areas 13a, 13b which include the cell 14. The node 41,12 comprising a processor 42 operable to execute stored instructions and operable when executing instructions to initiate: (1) broadcasting 21 information on identifiers of at least some of the multiple MBSFN areas 13a, 13b to identify respective MBSFN area-specific MCCHs; and (2) transmitting 23 a MBMS notification message associated with one of said multiple MBSFN areas 13a, 13b based on the broadcasted information to the user equipments 11 in the cell 14 for notifying changes of information in one of the multiple MBSFN areas 13a, 13b.

Figure 5:
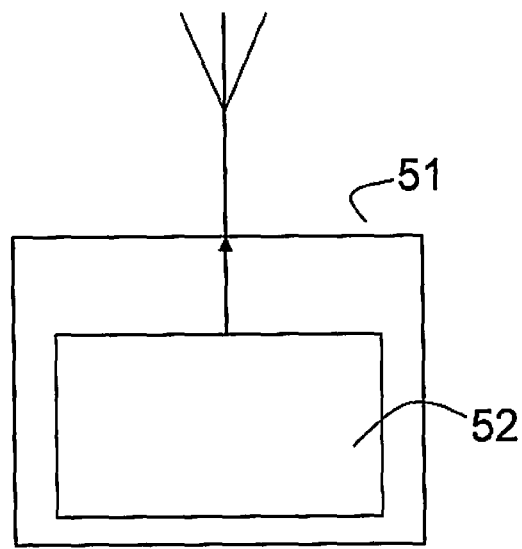
FIG. 5 illustrates an embodiment of an arrangement according to the present invention, in particular a user equipment.

In FIG. 5 there is illustrated a user equipment 51, 11 which is located in a cell 14 of a cellular communication system 10 in accordance with an embodiment of the present invention. The user equipment 51, 11 being associated with a network node 41, 12 providing broadcast information services in multiple MBSFN areas 13a, 13b which include the cell 14. The user equipment 51, 11 comprising a processor 52 operable to execute stored instructions and operable when executing instructions to initiate: (1) receiving 31 on a broadcast channel information on identifiers of at least some of the multiple MBSFN areas 13a, 13b to support identifying respective MBSFN area-specific MCCHs; (2) receiving 32 a MBMS notification message; and, (3) deriving 33 from at least an identifier of one or more of the multiple MBSFN areas 13a, 13b included in the received MBMS notification message, the one MCCH associated with one or more of the multiple MBSFN areas based on the broadcast information.

The invention claimed is:

1. A method performed in a node of a cellular communication system, said node providing communication services to a plurality of user equipments in a cell of said cellular communication system and said node supporting broadcast information services in multiple Multimedia Broadcast Multicast Services single frequency network (MBSFN) areas which include said cell, said method comprising:
   broadcasting, by the node, information on identifiers of at least some of said multiple MBSFN areas to identify respective area-specific Multimedia Broadcast Multicast Services (MBMS) control channels (MCCHs); and,
   transmitting, by the node, a MBMS notification message associated with one of said multiple MBSFN areas based on said broadcasted information to the user equipments in said cell for notifying changes of information in the one of said multiple MBSFN areas.

2. The method of claim 1, whereby each of said broadcasted MBSFN area identifiers comprise a unique radio network temporary identifier value.

3. The method of claim 1, whereby said broadcasted MBSFN area identifiers comprise a common radio network temporary identifier, and
   the method further comprising the step of transmitting, by the node, the MBMS notification message on a physical downlink control channel of said cell including an identifier of a specific MBSFN area and its respective area-specific MBMS control channel.

4. The method of claim 1, whereby said broadcasted information comprises radio frame offset information for the respective MBSFN areas; and
   the method further comprising the step of transmitting, by the node, said MBMS notification message for each of said multiple MBSFN areas on pre-defined subframes defined by said offset information.

5. A method in a user equipment in a cell of a cellular communication system, said user equipment being associated with a network node providing broadcast information services in multiple Multimedia Broadcast Multicast Services single frequency network (MBSFN) areas which include said cell, said method comprising:
   receiving, by the user equipment, on a broadcast channel information on identifiers of at least some of said multiple MBSFN areas to support identifying respective area-specific Multimedia Broadcast Multicast Services (MBMS) control channels (MCCHs);
   receiving, by the user equipment, a MBMS notification message; and, deriving, by the user equipment, from an identifier of one or more MBSFN areas included in the received MBMS notification message, the MBMS control channel (MCCH) associated with the one or more of said multiple MBSFN areas based on said broadcasted information.

6. The method of claim 5, whereby each of said received MBSFN area identifiers comprise a unique radio network temporary identifier value.

7. The method of claim 5, whereby said received MBSFN area identifiers consist of a common radio network temporary identifier, and the method further comprising the step of receiving, by the user equipment, the MBMS notification message on a physical downlink control channel of said cell including an identifier of a specific MBSFN area and its respective area-specific MBMS control channel.

8. The user equipment of claim 7, whereby said received identifiers comprise a common radio network temporary identifier used for all of the multiple MBSFN areas, and the processor further operable to initiate receiving the MBMS notification message on a physical downlink control channel (PDCCH) of said cell where the MBMS notification message comprises an identifier of a specific MBSFN area and information used by the user equipment to derive the one MCCH channel of the specific MBSFN area for which information changes in one of said multiple MBSFN areas applies.

9. The method of claim 5, whereby said received information comprises radio frame offset information for the respective MBSFN areas; and the method further comprising the step of receiving, by the user equipment, said MBMS notification message for each of said multiple MBSFN areas on pre-defined subframes defined by said offset information.

10. A node of a cellular communication system, said node providing communication services to a plurality of user equipments in a cell of said cellular communication system and said node supporting broadcast information services in multiple Multimedia Broadcast Multicast Services single frequency network (MBSFN) areas which include said cell, said node comprising:

a processor operable to execute stored instructions and operable when executing instructions to initiate:
broadcasting information on identifiers of at least some of said multiple MBSFN areas to identify respective area-specific Multimedia Broadcast Multicast Services (MBMS) control channels (MCCHs); and,
transmitting a MBMS notification message associated with one of said multiple MBSFN areas based on said broadcasted information to the user equipments in said cell for notifying changes of information in the one of said multiple MBSFN areas.

11. The node of claim 10, whereby each of said broadcasted MBSFN area identifiers comprise a unique radio network temporary identifier value.

12. The node of claim 10, whereby said broadcasted MBSFN area identifiers comprise a common radio network temporary identifier, and the processor further operable to transmitting the MBMS notification message on a physical downlink control channel of said cell including an identifier of a specific MBSFN area and its respective area-specific MBMS control channel.

13. The node of claim 10, whereby said broadcasted information comprises radio frame offset information for the respective MBSFN areas; and the processor further operable to transmitting said MBMS notification message for each of said multiple MBSFN areas on pre-defined subframes defined by said offset information.

14. A user equipment in a cell of a cellular communication system, said user equipment being associated with a network node providing broadcast information services in multiple Multimedia Broadcast Multicast Services single frequency network (MBSFN) areas which include said cell, said user equipment comprising:

a processor operable to execute stored instructions and operable when executing instructions to initiate:
receiving on a broadcast channel information on identifiers of at least some of said multiple MBSFN areas to support identifying respective area-specific Multimedia Broadcast Multicast Services (MBMS) control channels (MCCHs);
receiving a MBMS notification message; and,
deriving from an identifier of one or more MBSFN areas included in the received MBMS notification message, the MBMS control channel (MCCH) associated with the one or more of said multiple MBSFN areas based on said broadcasted information.

15. The user equipment of claim 14, whereby each of said received MBSFN area identifiers comprise a unique radio network temporary identifier value.

16. The user equipment of claim 14, whereby said received MBSFN area identifiers consist of a common radio network temporary identifier, and the processor further operable to receiving the MBMS notification message on a physical downlink control channel of said cell including an identifier of a specific MBSFN area and its respective area-specific MBMS control channel.

17. The user equipment of claim 14, whereby said received information comprises radio frame offset information for the respective MBSFN areas; and the processor further operable to receiving said MSMB notification message for each of said multiple MBSFN areas on pre-defined subframes defined by said offset information.

18. A node of a cellular communication system, wherein:
said node configured for providing communication services to a plurality of user equipments in a cell of said cellular communication system;
said node configured for supporting broadcast information services in multiple Multimedia Broadcast Multicast Services single frequency network (MBSFN) areas which include said cell, said node comprising:
a processor operable to execute stored instructions and operable when executing instructions to initiate:
broadcasting information on identifiers of at least some of said multiple MBSFN areas to identify respective MBSFN area-specific Multimedia Broadcast Multicast Services (MBMS) control channels (MCCHs); and,
transmitting a MBMS notification message associated with one of said multiple MBSFN areas based on said broadcasted information to the user equipments in said cell for notifying changes of information in the one of said multiple MBSFN areas.

19. The node of claim 18, whereby said broadcasted identifiers comprise a common radio network temporary identifier used for all of the multiple MBSFN areas, and the processor further operable to initiate the transmitting of the MBMS notification message on a physical downlink control channel (PDCCH) of said cell where the MBMS notification message comprises an identifier of a specific MBSFN area and information so the user equipments can distinguish a specific MCCH channel of the specific MBSFN area for which the information changes in one of said multiple MBSFN areas applies.

20. A user equipment in a cell of a cellular communication system, said user equipment being associated with a network node providing broadcast information services in multiple Multimedia Broadcast Multicast Services single frequency network (MBSFN) areas which include said cell, said user equipment comprising:

a processor operable to execute stored instructions and operable when executing instructions to initiate:

receiving information on a broadcast channel where the information comprises identifiers of at least some of said multiple MBSFN areas to support identifying respective MBSFN area-specific Multimedia Broadcast Multicast Services (MBMS) control channels (MCCHs);

receiving a MBMS notification message; and, deriving from at least an identifier of one or more of the multiple MBSFN areas included in the received MBMS notification message, the one MBMS control channel (MCCH) associated with the one or more of said multiple MBSFN areas based on said broadcasted information.

* * * * *

UNITED STATES PATENT AND TRADEMARK OFFICE
CERTIFICATE OF CORRECTION

| | |
|---|---|
| PATENT NO. | : 9,668,237 B2 |
| APPLICATION NO. | : 13/380231 |
| DATED | : May 30, 2017 |
| INVENTOR(S) | : Huschke et al. |

It is certified that error appears in the above-identified patent and that said Letters Patent is hereby corrected as shown below:

In the Specification

In Column 1, Line 38, delete "MEMS" and insert -- MBMS --, therefor.

In Column 1, Line 66, delete "MEMS" and insert -- MBMS --, therefor.

In Column 2, Line 7, delete "broadcast channel" and insert -- broadcast control channel --, therefor.

In Column 2, Line 31, delete "MBFSN-areas." and insert -- MBSFN-areas. --, therefor.

In Column 3, Line 27, delete "downlink" and insert -- downlink control --, therefor.

In Column 3, Line 43, delete "MEMS" and insert -- MBMS --, therefor.

In the Claims

In Column 5, Line 18, in Claim 20, delete "user equipment" and insert -- method --, therefor.

In Column 6, Line 38, in Claim 17, delete "MSMB" and insert -- MBMS --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*